United States Patent [19]

Hahle

[11] Patent Number: 4,707,149

[45] Date of Patent: Nov. 17, 1987

[54] BEARING HAVING A DIVIDED HOUSING FOR STABILIZING IN MOTOR VEHICLE

[75] Inventor: Hermann Hahle, Damme, Fed. Rep. of Germany

[73] Assignee: Lemförder Metallwaren A.G., Fed. Rep. of Germany

[21] Appl. No.: 902,477

[22] Filed: Sep. 2, 1986

[30] Foreign Application Priority Data

Sep. 3, 1985 [DE] Fed. Rep. of Germany ....... 3531340

[51] Int. Cl.⁴ .......................... F16C 9/02; F16C 33/02
[52] U.S. Cl. ...................................... 384/294; 384/276
[58] Field of Search .............. 384/216, 220, 221, 273, 384/276, 280, 281, 294–297, 448

[56] References Cited

U.S. PATENT DOCUMENTS

| | | | |
|---|---|---|---|
| 138,709 | 5/1873 | Sylvester | 384/294 X |
| T893,014 | 12/1971 | Gatzemeyer et al. | 384/276 |
| 1,717,873 | 6/1929 | Brush | 384/281 |
| 2,776,175 | 1/1957 | Waite | 384/294 |
| 4,491,429 | 1/1985 | Matoba et al. | 384/221 |

FOREIGN PATENT DOCUMENTS

| | | | |
|---|---|---|---|
| 1163360 | 9/1958 | France | 384/276 |
| 1277819 | 10/1961 | France | 384/276 |
| 9604 | of 1914 | United Kingdom | 384/276 |

Primary Examiner—Stuart S. Levy
Assistant Examiner—Thomas R. Hannon
Attorney, Agent, or Firm—McGlew and Tuttle

[57] ABSTRACT

The bearing for stabilizers, or the like, in motor vehicles has a two-part housing that is divided along an axial plane and holds an inner bushing of an elastomer material. This inner bushing is movably inserted in a slide sleeve and both are divided along an axial plane. The dividing plane of the inner bushing and the slide sleeve are at an angle, with respect to a dividing plane of the housing, and the slide sleeve is secured against turning in the housing.

7 Claims, 7 Drawing Figures

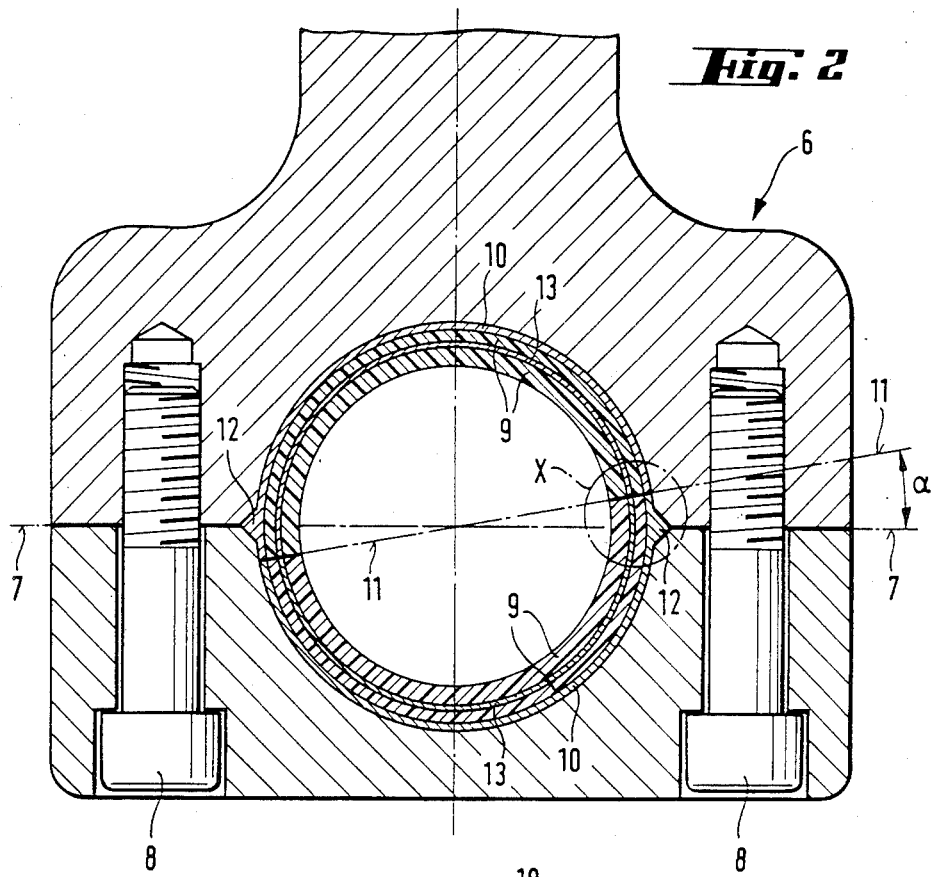
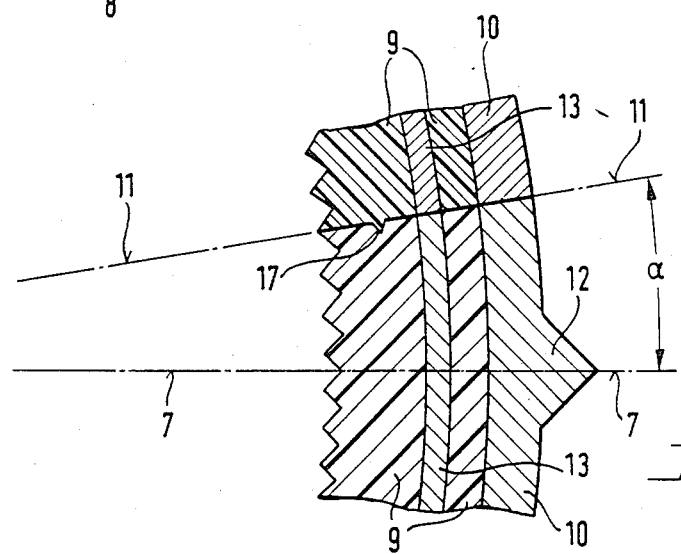

BEARING HAVING A DIVIDED HOUSING FOR STABILIZING IN MOTOR VEHICLE

FIELD AND BACKGROUND OF THE INVENTION

The invention relates in general to resilient supports and in particular to a new and useful bearing with a divided housing for stabilizers or the like in motor vehicles.

Similar design characteristics are known from German patent No. 27 37 898 in conjunction with elastic swivel joints having no division along an axial plane providing a swivel joint with inward radial resilience in the face of shock loads in that direction. The problem with using such bearings to support stabilizers in motor vehicles is such that the bearing point or points of the stabilizers have a smaller diameter than the forged ends of the stabilizers. Bearings pursuant to prior art are therefore not usable for this appliction, because the inner bushing consisting of an elastomer material cannot be streched enough to be slided over the thicker ends of the stabilizers. The state of the art in practice is to divide the housing of the bearing along an axial plane and to slit the elastic inner bushing lengthwise at one point, the outer surface of the inner bushing being contoured and engaging with a corresponding opposing shape on the inner surface of the two-part housing. When the inner bushing is tightened as the housing is put together, the inner bushing also encompasses the bearing point of the stabilizer, so that here again a firm grip is achieved by friction. The torsion angles of the stabilizer with respect to the housing are compensated for only by molecular deformation of the material of which the inner bushing is made. Because of the high radial stress on such bearings and the torsion angles simultaneously incurred, signs of wear appear early. If the grip of the inner bushing on the stabilizer is insufficient, the stabilizer slips through, causing a great deal of abrasion that shortens the useful life of the inner bushing. If the inner bushing of an elastomer material is freely deformable, that material can issue out of the ends in an uncontrolled manner, causing the bearing to lose functioning capacity quickly and leading to early breakdown. Another undesirable feature with such bearings is the high righting moment that builds up with molecular deformation.

SUMMARY OF THE INVENTION

The invention provides a bearing with a divided housing for stabilizers or the like in motor vehicles such that it allows for large torsion angles with minimal righting moment and regardless of the size of the components can be mounted easily at the bearing point with a tight fit.

In accordance with the invention a bearing, particularly for stabilizers in motor vehicles comprises a divided housing which is divided along an axial plane and has an inner bushing of an elastomer material therein with a radial gap and arranged within a slide sleeve. The bushing is movably mounted inside the slide sleeve and both the slide sleeve and the bushing are divided along separate axial planes which are at an angle from each other and the slide sleeve is secured against rotation within the housing.

Among the substantial advantages of these design characteristics is the creation of a divided slide bearing for applications of the kind commonly encountered with the bearings of stabilizers of motor vehicles, particularly stabilizers in trucks. This slide bearing has the elasticity of conventional bearings used for the same purpose and lends itself to simple, precise installation, while the torsional movements of the stabilizer with respect to the housing are nonetheless compensated for by sliding, practically without a righting moment, particularly when a lubricant is introduced between the inner bushing and the slide sleeve. Torsional movements thus no longer have a molecular deformation effect on the inner bushing of an elastomer material. This lays the groundwork for the further substantial advantage that this inner bushing of an elastomer material when used in conjunction with the design characteristics pursuant to the invention can be reinforced, so that radial and axial stresses can be better absorbed. In a special embodiment of the invention, it is provided that such reinforcement, embedded in the elastomer material of the inner bushing, comprises half shells that have collar flanges on both ends that project beyond the housing and wrap around the housing at an angle of approximately 90°. In this way axial stresses are optimally absorbed, and of prime importance, the material of the inner bushing is prevented from issuing out of the housing at the ends under heavy stress. At the same time this collar flange is useful in interim transport and in the assembly of the bearing. In order to make the preassembly of the bearing easier, the two end collar flanges are angled slightly inward, so that the slide sleeve is held in place by the resulting slight grip on the outside of the housing until final assembly. The inner bushing of an elastomer material is in turn held sufficiently securely in the slide sleeve by the suction effect of the lubricating grease until final erection. The lubricant introduced between the outer surface of the inner sleeve and the inner surface of the slide shell, which is made of plastic, for example, or a combination of plastic and a wire fabric, steel with a bronze frame or another appropriate material, is locked in by the fact that the gap of the housing is at an angle with respect to the gap of the inner bushing and slide sleeve and is thus prevented from running out. On the ends, the placement of sealing lips on the collar flanges of the inner bushing is suggested, so that the material of the inner bushing lies tight against the collar flange of the slide shell.

An object of the invention is to provide an improved bearing for stabilizers in motor vehicles which includes a two part housing provided with a bushing movably arranged within a slide sleeve and wherein the bushing and the slide sleeve are divided along axial planes which are at an angle to the dividing plane of the parts of the housing, the slide sleeve being secured against turning in the housing.

A further object of the invention is to provide a bearing for stabilizers which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 2 is a cross-section through a bearing of FIG. 1 pursuant to the invention, on a larger scale than FIG. 1;

FIG. 5 is a detail of FIG. 3 much enlarged;

DESCRIPTION OF THE PREFERRED EMBODIMENTS

Figure 1:
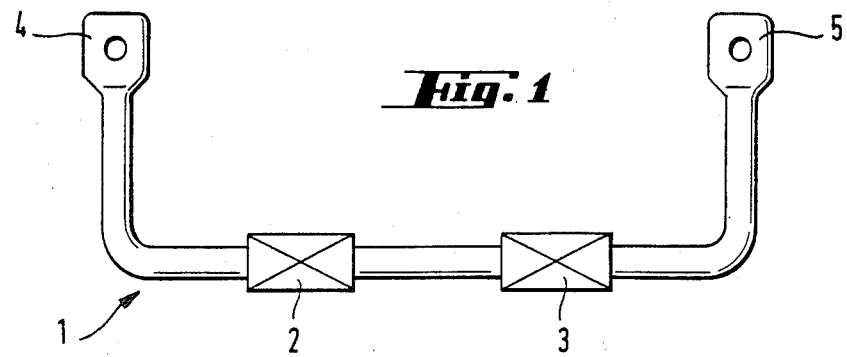
FIG. 1 is a schematic representation of a stabilizer in a motor vehicle with two bearing points, much reduced in scale.
Figure 3:
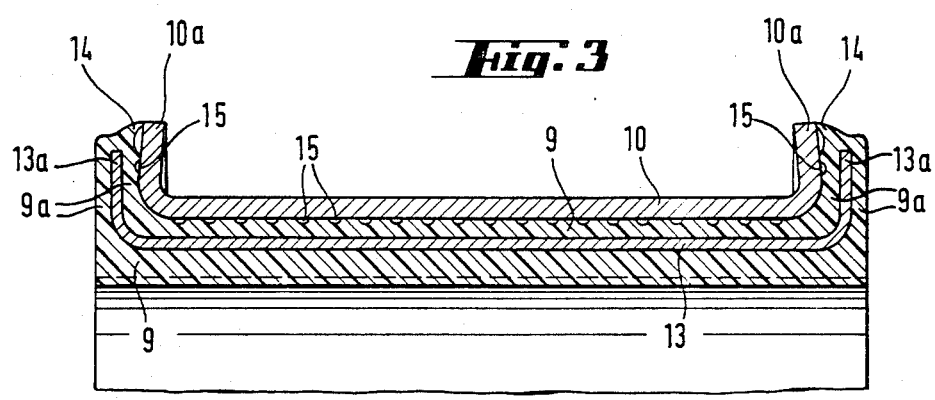
FIG. 3 is a longitudinal section through a portion of the bearing in FIG. 2.
Figure 4:
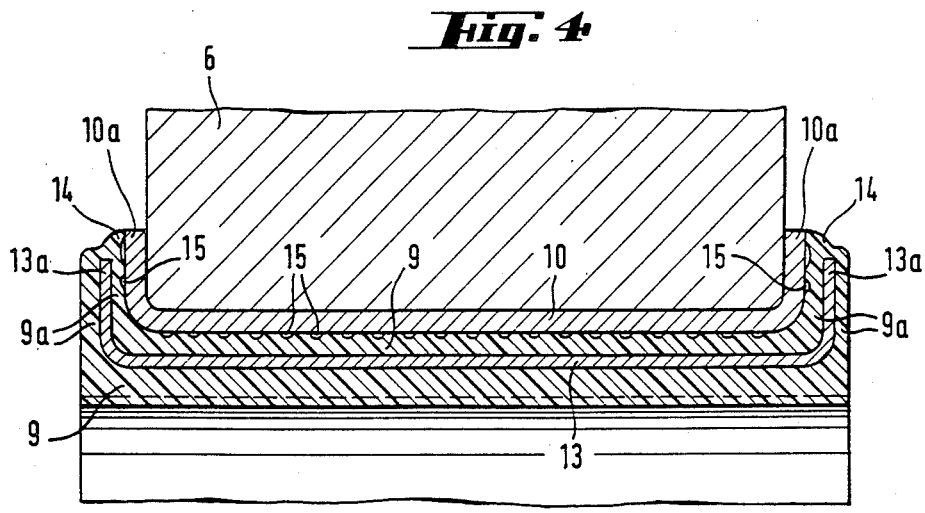
FIG. 4 is longitudinal section through the inner bushing with slide shell as shown in FIG. 3, a partial view.
Figure 6:
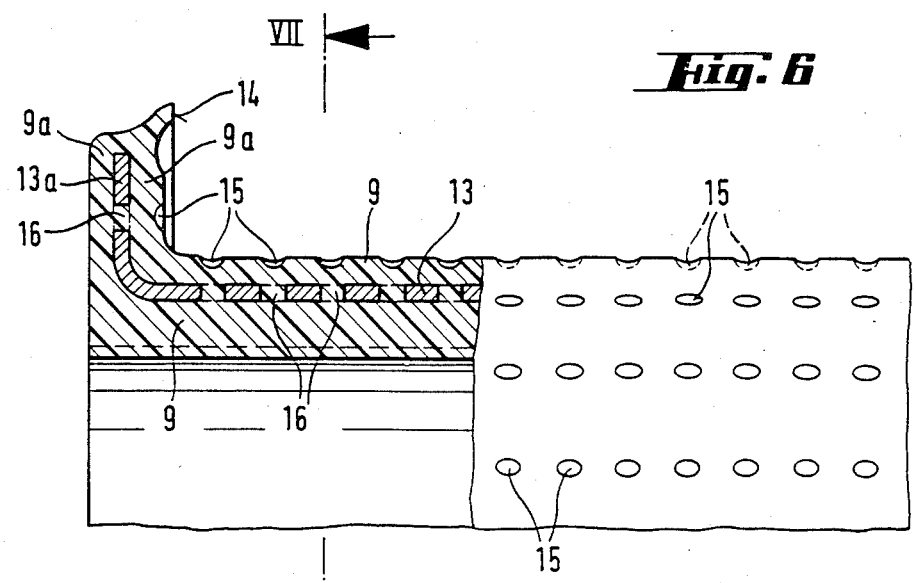
FIG. 6 is a representation of the inner bushing, partly in section, partly in front view, on a larger scale than FIGS. 2 through 4.
Figure 7:
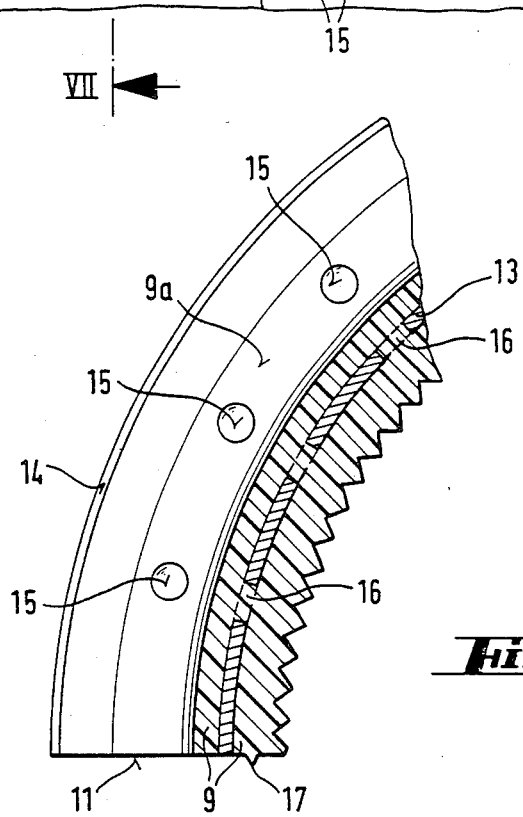
FIG. 7 is a partial side view of the inner bushing shown in FIG. 6.

Referring to the drawings in particular, the invention embodied therein comprises in the embodiments of FIGS. 1 to 3, a bearing such as the bearings 2 and 3 shown in FIG. 1 which includes a housing 6 divided along an axial dividing plane 7 in accordance with the invention, an inner bushing of elastomer material 9 is arranged within a slide sleeve 10 and each has a radial gap, being divided along separate axial planes at angles to each other, the sleeve being secured against turning inside the housing 6.

The bearing shown in FIGS. 2 through 7 is designed in particular to support a stabilizer 1 at points 2 and 3, which is depicted schematically on a reduced scale in FIG. 1 with broadened ends 4 and 5, usually forged on. The bearing has a two-part housing 6 with a dividing plane 7 that encompasses the longitudinal axis. Both parts of the housing 6 can be tightened by means of tightening screws. In the bearing an inner bushing 9 of an elastomer material is turnably mounted inside a slide sleeve or slide wheel 10. Both the inner bushing 9 and the slide shell 10 are designed as two half-shell segments, but are so postitioned that the dividing plane 11 of the inner bushing 9 and the slide shell 10 forms an angle α with the dividing plane 7 of the housing (FIG. 2). By this means the dividing gaps of the housing 6 and the slide sleeve 10 and inner bushing 9 are staggered, so that they mutually seal each other. In the area of the dividing plane 7, the edges of the two parts of the housing 6 are provided with a chamfer, so that when the housing 6 is assembled there is a groove created that runs on both sides parallel to the bearing axis. In these two grooves, the half-shells of the slide sleeve 10 engage, each with a correspondingly shaped projection 12 that is positioned on the half-shell at an angle α from the dividing plane 11 (FIGS. 2 and 5). The slide sleeve 10 is thereby prevented from turning with respect to the housing 6. The inner bushing 9 of an elastomer material turnably mounted inside the slide sleeve 10 has an internal reinforcing inset 13. e.g. a sheet metal sleeve or the like. The slide sleeve 10 and the inner bushing 9 with the reinforcing inset 13 extend beyond the length of the housing 6 at both ends and have a flanged edge that extends radially outwardly outside the housing and surrounds the housing 6 at an angle of approximately 90°. For purposes of assembly, the flange edge 10a of the slide sleeve 10 in pre-assembled state is bent at an angle of slightly more than 90° and inward, so that after assembly the slide shell grips the outer sides of the housing 6 firmly and thus provides sufficient security against getting lost for the pre-assembly stage. Against the outside of the radially oriented collar flange 10a of the slide shell 10 lies a sealing lip 14 on the flanged edge 9a of the inner bushing 9 and thus prevents the lubricant introduced between the outer surface of the inner bushing 9 and the inner surface of the slide shell 10 from flowing out. The reinforcement 13 embedded in the elastomer material of the inner bushing also has a radially oriented flanged edge 13a that prevents the material of the inner bushing 9 from coming out the ends under heavy stress. To receive the lubricant on the outer circumference of the inner bushing 9 it is helpful to provide recesses 15, e.g. in what is known as the honeycomb pattern. According to a particular development of the invention, holes 16 are positioned in the shell segments of the reinforcement 13a at the spots where the recesses 15 will be on the outer circumference of the inner bushing 9, so that after vulcanization of the elastomer material the holes disappear and the recesses 15 are created on the outer surface of the inner bushing 9. In order to prevent the lubricant from moving inward along the dividing plane 11 to the surface of the stabilizer, seals are provided in the shell halves. On one end is a groove, on the other a tongue 17, the two having corresponding sloped surfaces, so that upon assembly of the two half-shells turned 180° to one another upon tightening each tongue 17 engages in a groove and provides the desired sealing effect. While specific embodiments of the invention have been shown and described in detail to illustrate the application of the principles of the invention, it will be understood that the invention may be embodied otherwise without departing from such principles.

What is claimed is:

1. A bearing comprising a housing having two divided parts, said parts being divided along an axial plane, a slide sleeve arranged within said housing and secured against turning inside said housing, an inner bushing of elastomer material arranged within said slide sleeve and also being divided along the same axial plane as said slide sleeve, both said slide sleeve and said inner bushing being divided at a dividing plane which is at an angle to the dividing plane of said housing divided parts, said housing divided parts having inner circumferential surfaces and chamfered edges and having a plurality of grooves running lengthwise along said surfaces, said slide sleeve having a projection on its outer surface complementary to and engaging with said grooves, both said projections and said grooves extending at an angle from its dividing plane.

2. A bearing according to claim 1, wherein said side sleeve has a flanged edge at both ends disposed radially and extending around the housing at an angle of approximately 90°.

3. A bearing according to claim 2, wherein said inner bushing has a reinforcing inset of metal.

4. A bearing according to claim 3, wherein said inner bushing and said reinforcing insert reach around the housing at both ends and have a radially oriented flange at each end.

5. A bearing according to claim 4, wherein the flange edge of said slide sleeve reaches around the housing with an initial tension.

6. A bearing according to claim 5, wherein the reinforcing insert comprises a sheet metal shell wall having holes therethrough.

7. A bearing according to claim 6, wherein the wall holes in the sheet metal shell reinforce the interior of said bushing and are positioned in a pattern that is negative of a honeycomb structure so as to constitute receiving pockets for lubricant on the inner surface of said inner bushing.

* * * * *